Figure 1:
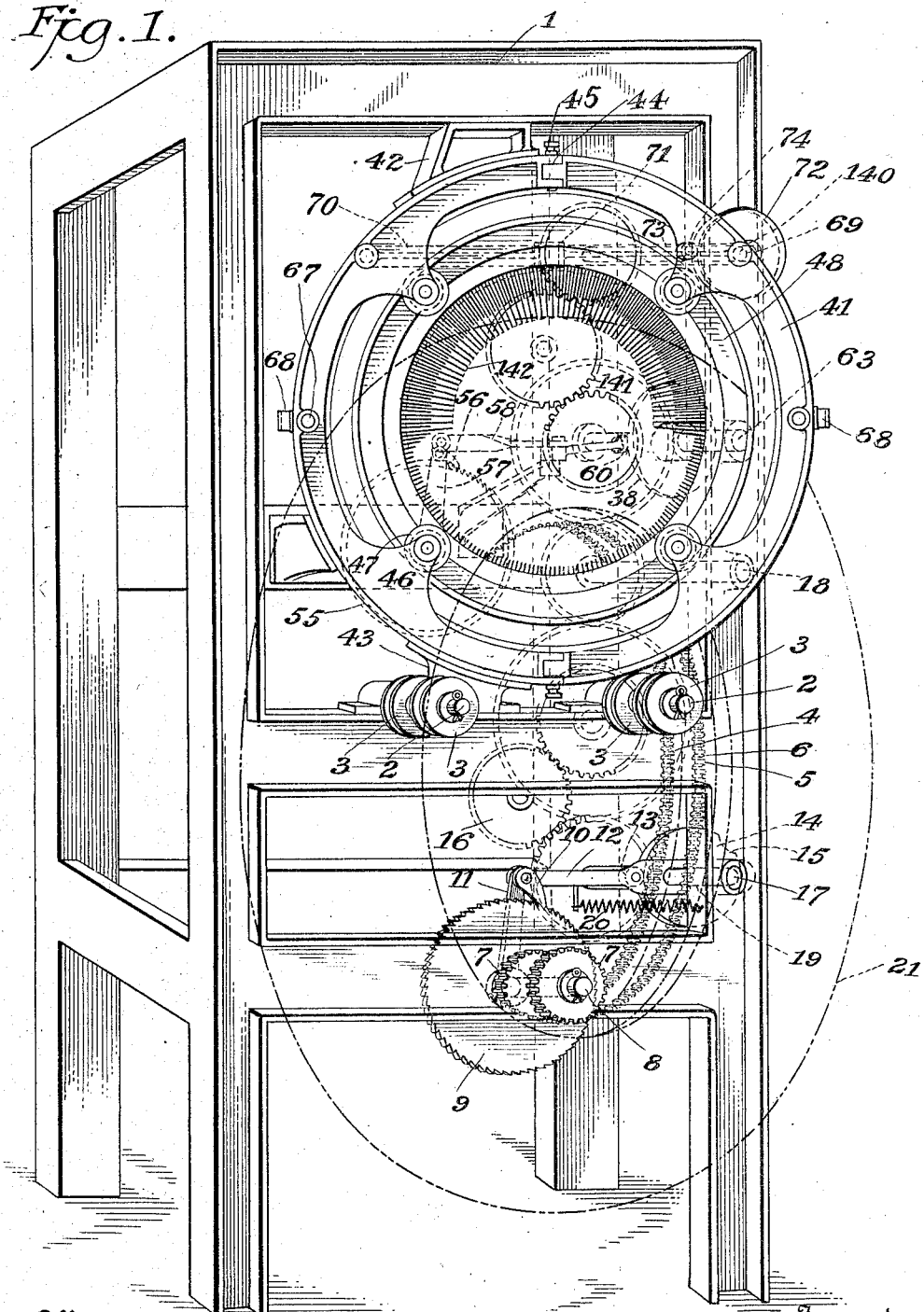

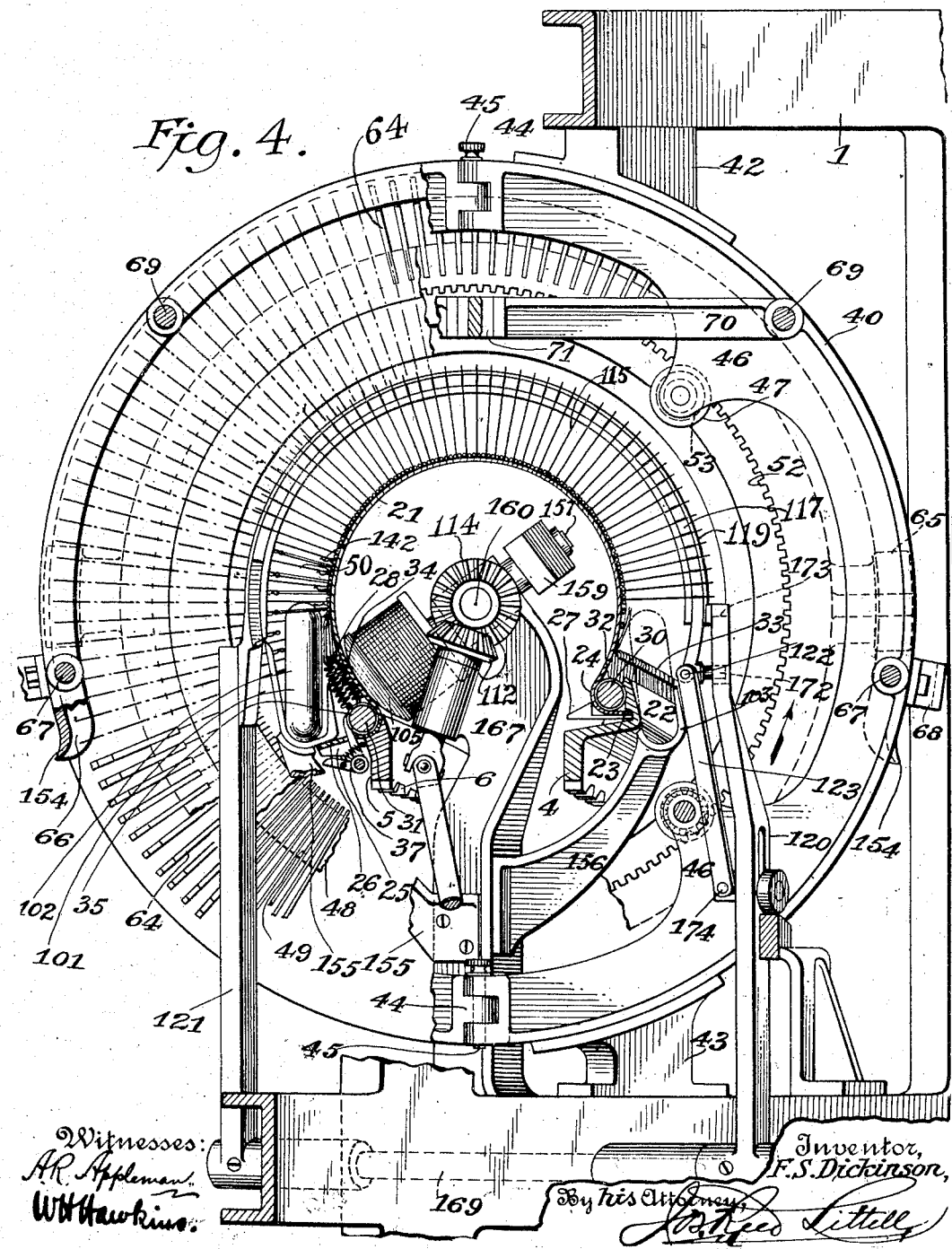

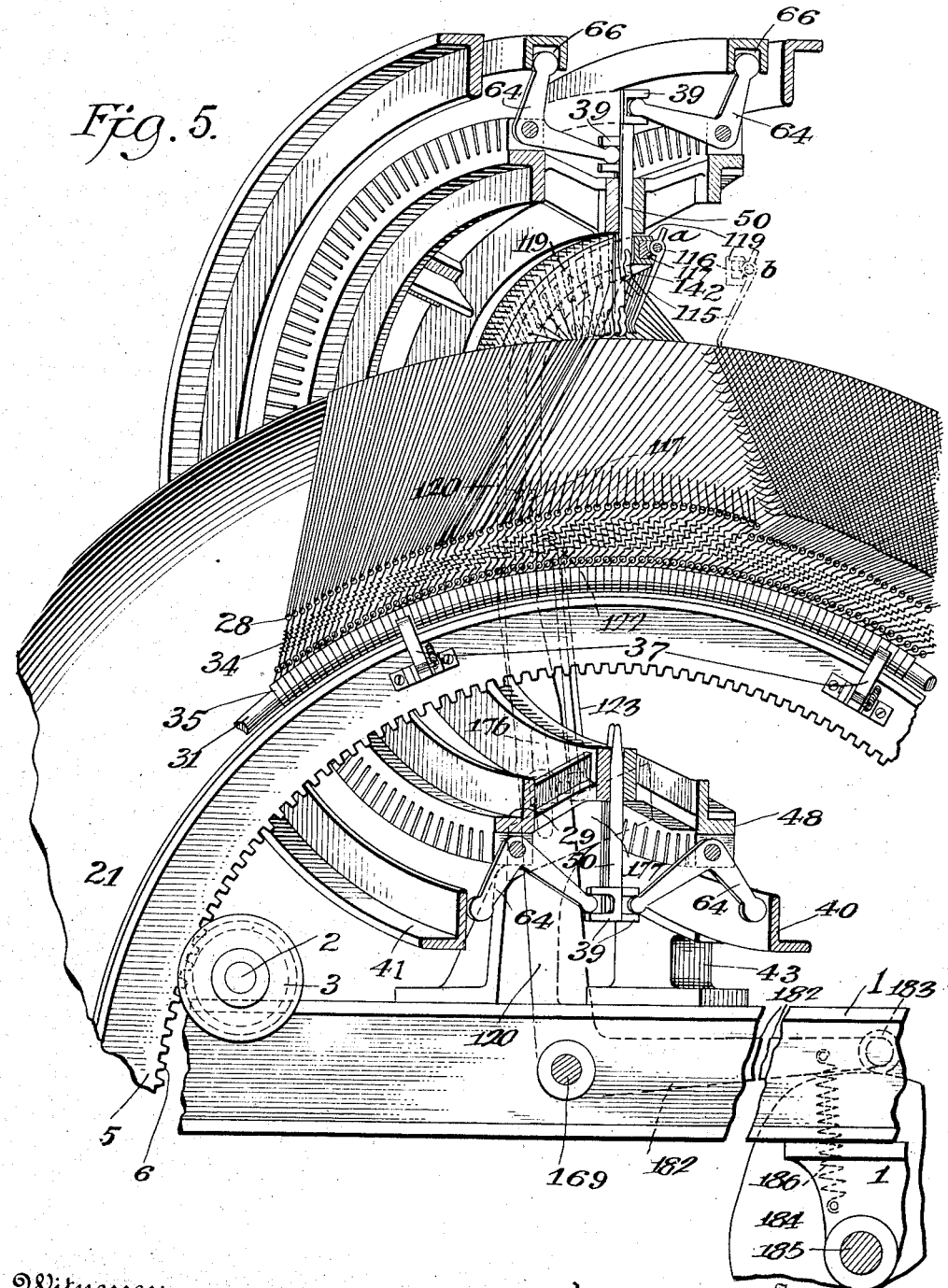

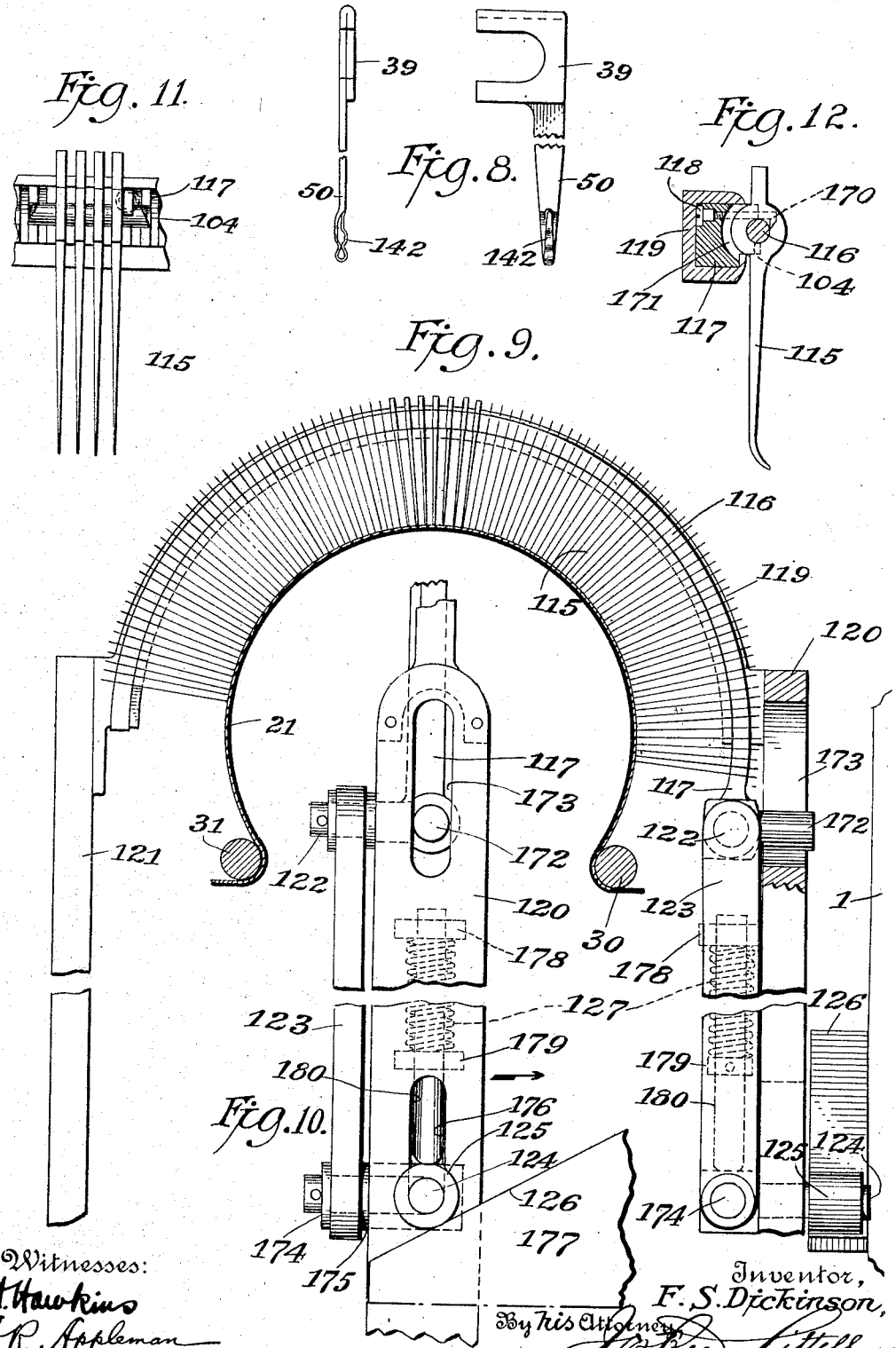

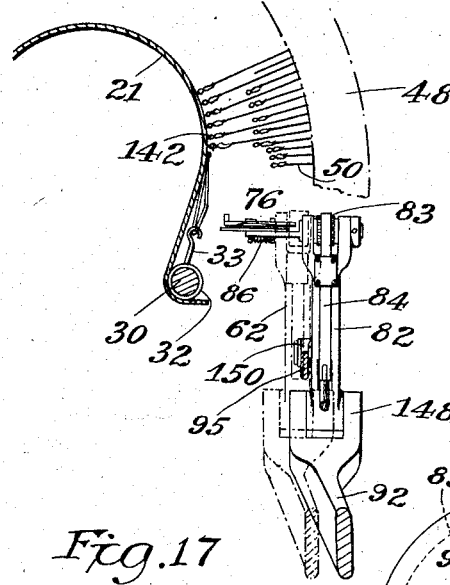
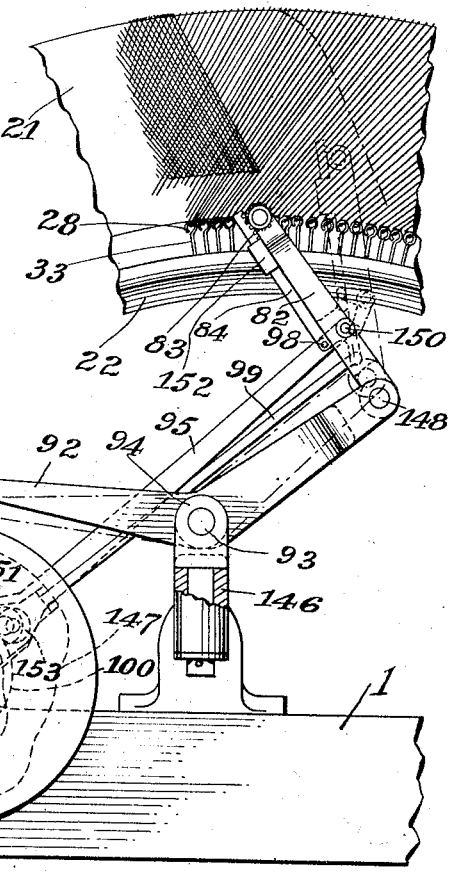
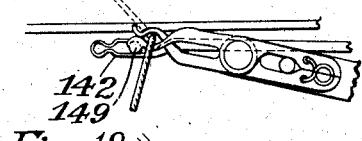
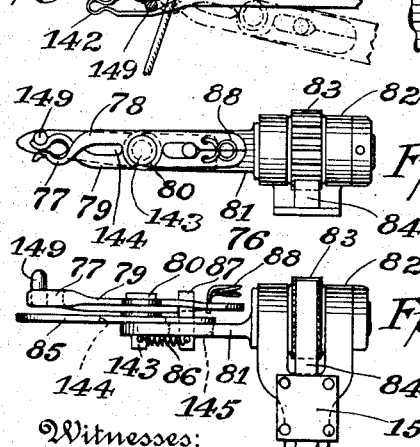

F. S. DICKINSON.
LOOM.
APPLICATION FILED SEPT. 30, 1914.
1,176,818.
Patented Mar. 28, 1916.
9 SHEETS—SHEET 8.
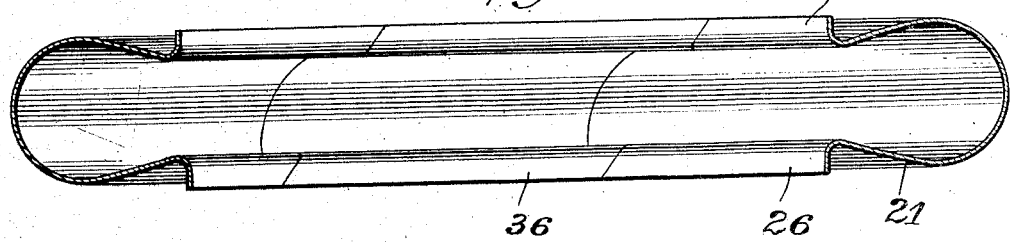
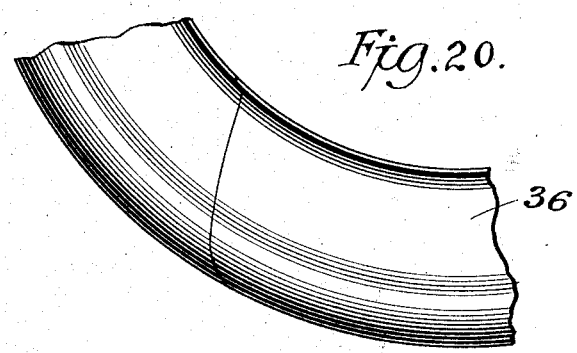
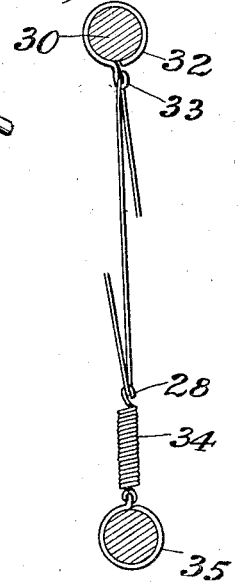
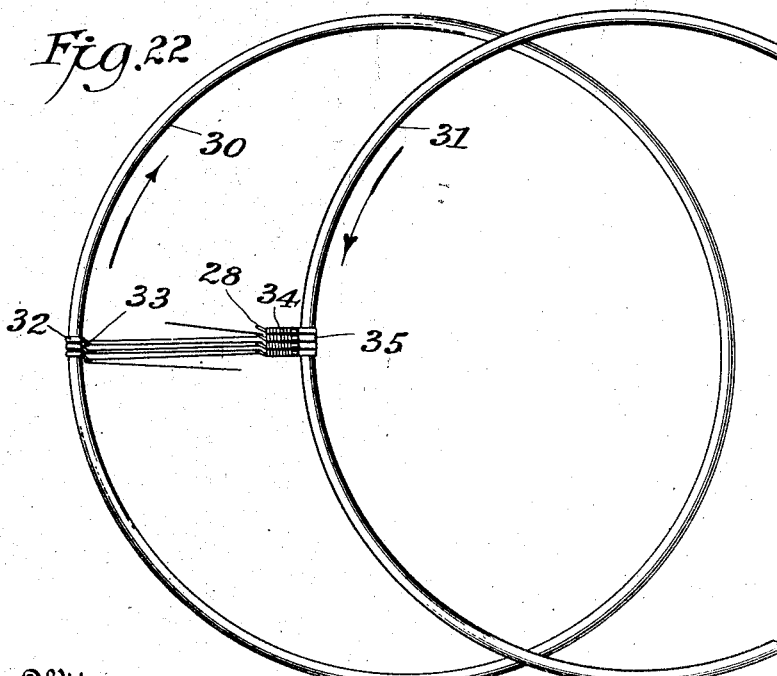
Witnesses:
W. H. Hawkins
A. R. Appleman
Inventor,
Fredrick S. Dickinson,
By his Attorney

F. S. DICKINSON.
LOOM.
APPLICATION FILED SEPT. 30, 1914.

1,176,818.

Patented Mar. 28, 1916.
9 SHEETS—SHEET 9.

Witnesses:
A. R. Appleman
W. H. Hawkins.

Inventor,
Fredrick S. Dickinson,
By his Attorney

UNITED STATES PATENT OFFICE.

FREDRICK S. DICKINSON, OF NEW YORK, N. Y.

LOOM.

1,176,818.　　　　Specification of Letters Patent.　　Patented Mar. 28, 1916.

Application filed September 30, 1914. Serial No. 864,237.

*To all whom it may concern:*

Be it known that I, FREDRICK S. DICKINSON, a citizen of the United States, and resident of New York, in the county and State of New York, have invented certain new and useful Improvements in Looms, of which the following is a specification.

This invention relates to looms, and it has special relation to an improved loom mechanism for weaving an endless fabric in annular and segmental cross-section ring form or contour initially conforming to the contour of the elastic body of a tire shoe or casing within which it is to be embedded, which fabric it adapted to be employed as the body fabric or carcass in the shoe or casing of pneumatic wheel-tires for automobiles or the like.

The object of my invention is to provide an improved loom which will be adapted to effectively weave a fabric of the character above set forth, in such shape as to conform to the normal contour of the shoe or casing, without stretching, pulling, packing, or otherwise distorting its initial woven contour and without stretching or distortion of its threads or strands, whereby the fabric in its adaptation for use will maintain a uniform tension on each and every strand of both warp and woof threads throughout the body of the completed fabric and will thereby retain the initial strength of each strand in the woven mass.

A further object of my invention is to provide an improved loom mechanism for producing a fabric such as that just described either in single or multiple plies, either by interweaving the multiple plies in a unitary homogeneous textile unit or by weaving the plies separately in condition to be connected together in multiple relationship to produce the complete body fabric.

A further object of my present invention is to provide an improved loom mechanism for producing a fabric such as that just described in which the weave will be on the bias with relation to its service conditions in the tire, or at an angle to the cross and circumferential section of the tire, whereby any tendency to roll on the rim by reason of the force of any side stress upon the tire, as in going around corners or making a short turn, will be obviated.

A further object of my invention is to provide a simple and improved loom mechanism, which will in its leading features be adapted for effective weaving under usual or general conditions, which will be positive and convenient in operation and which will furthermore possess advantages in point of adaptability to various forms of weaving, in effectiveness, and in general efficiency.

My present invention also has particular relation to an improved loom mechanism for weaving the type of body fabric for pneumatic tires which is covered by my applications for Patents Serial Nos. 725,245 and 725,246, to which reference may be had for a detail understanding of the type of textile body fabric or carcass for the shoe or casing of pneumatic tires, which is adapted to be produced by the improved loom herein set forth.

Figure 2:
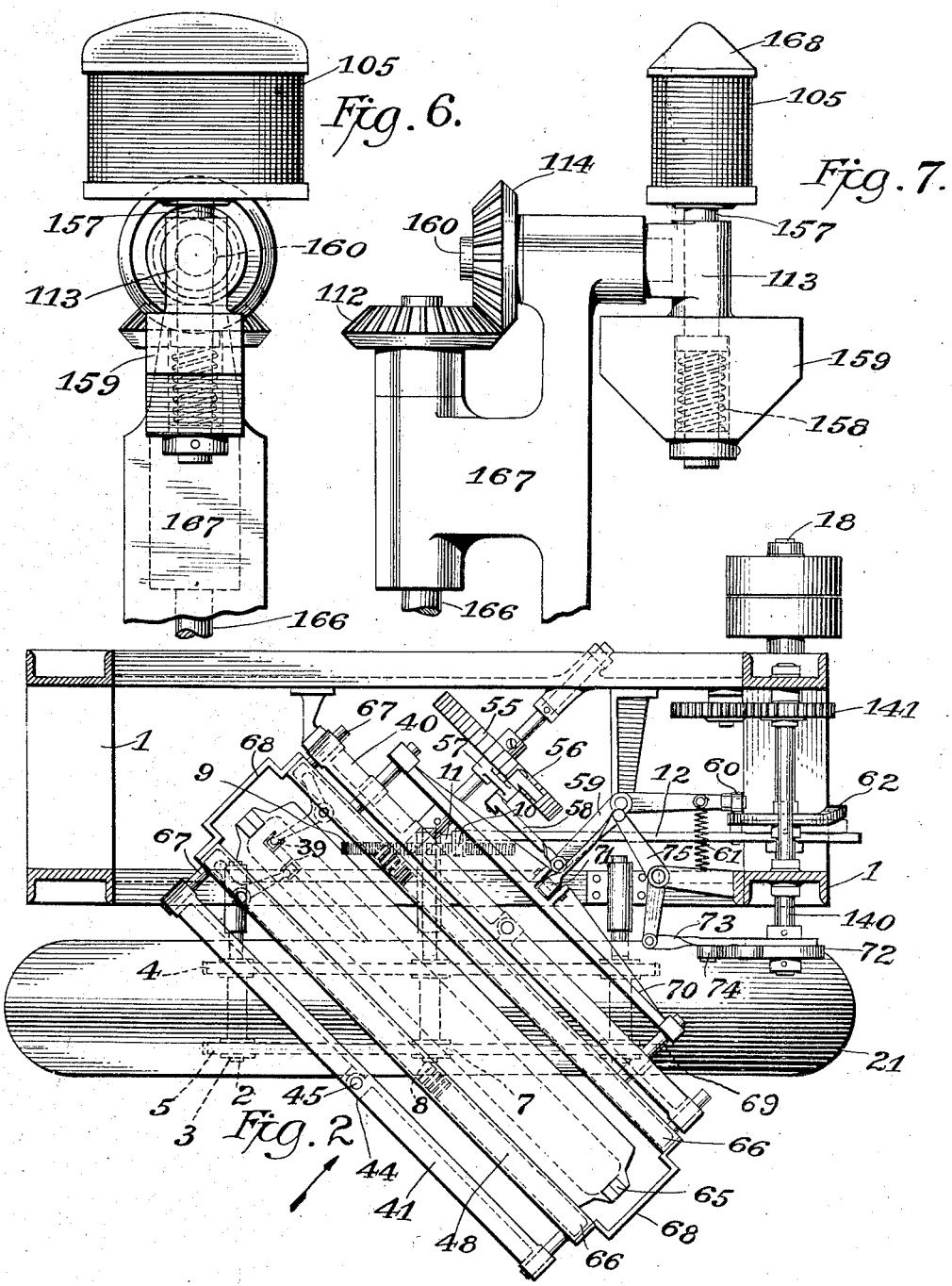
Figure 3:
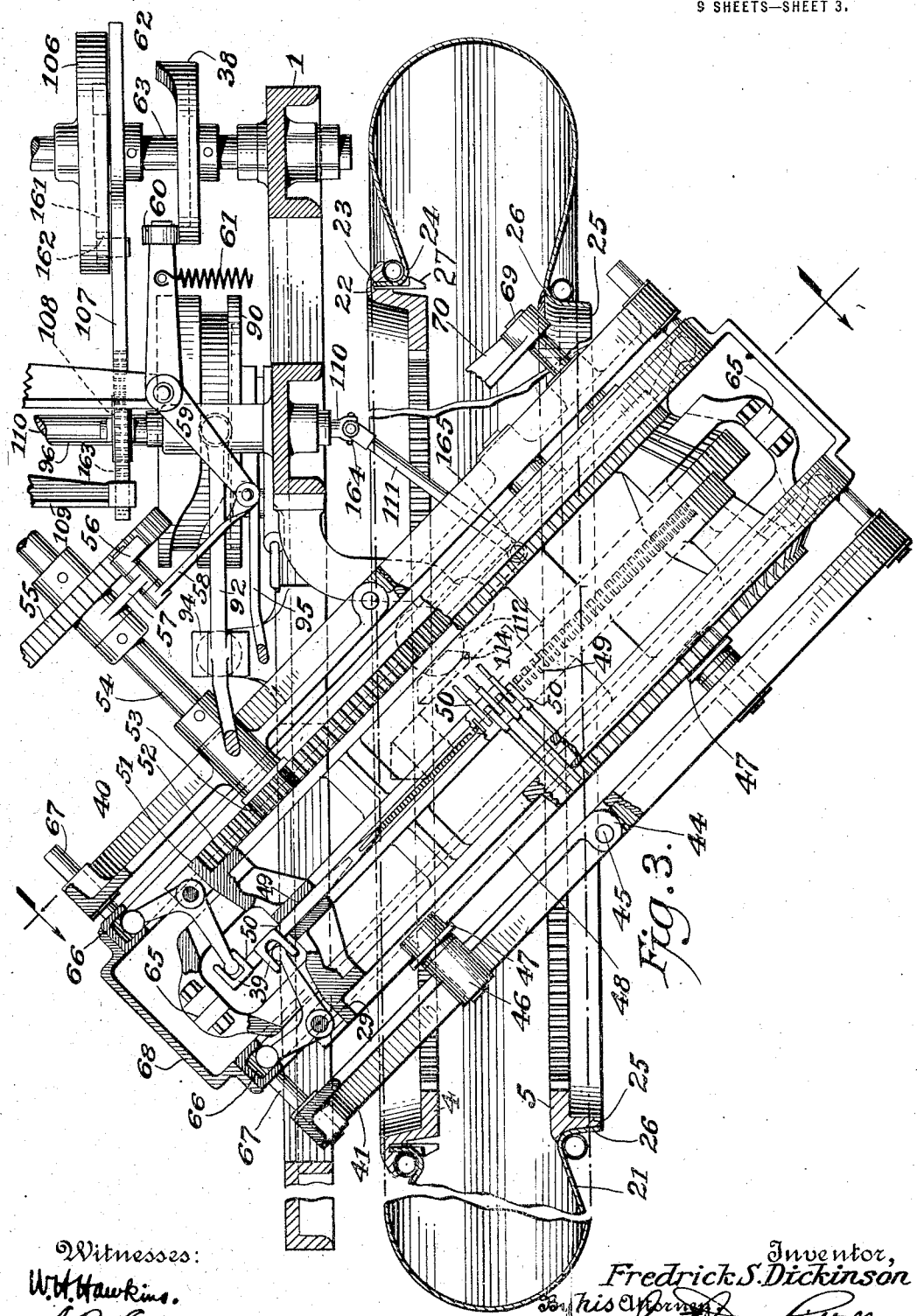
Figure 25:
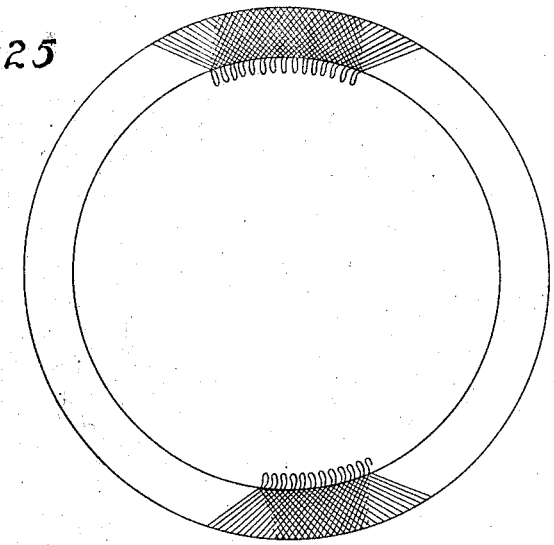
Figure 26:
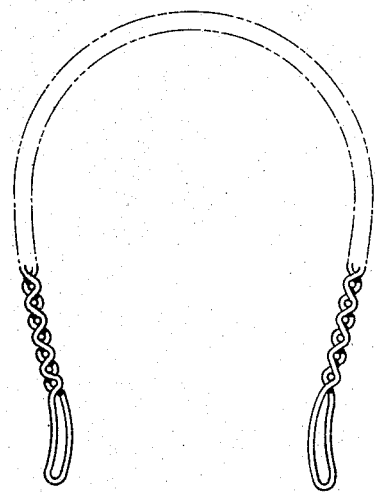
Figure 24:
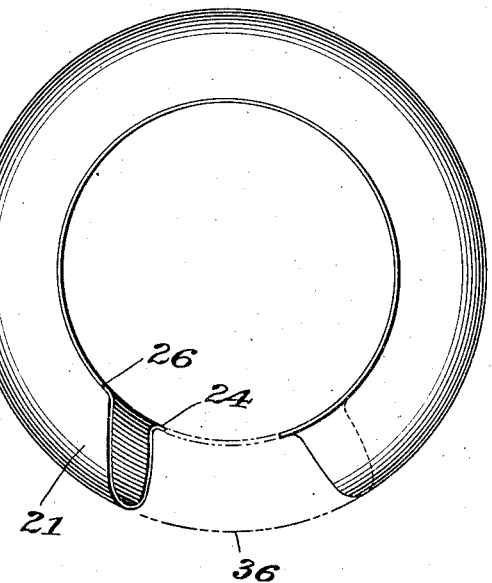

In the drawings—Figure 1 is a perspective view illustrating one embodiment of my improved loom mechanism, parts being shown in outline, looking toward the front in the direction of the arrow, Fig. 2. Fig. 2 is a top or plan view of the loom mechanism, the upper part of the frame being removed. Fig. 3 is a sectional plan view, illustrating the heddle harness, with the fabric-form sectioned on its horizontal axis. Fig. 4 is a side elevation, partly in section, illustrating the heddle harness. Fig. 5 is a perspective view, partly in section, illustrating the heddle harness and showing a portion of the fabric-form in front elevation. Fig. 6 is a detail view, showing a front elevation of a part of the electro-magnet mechanism for controlling the shuttle. Fig. 7 is a side elevation of the mechanism shown in Fig. 6. Fig. 8 is a detail view, showing a side and front elevation of the heddle. Fig. 9 is an elevation, partly in section, illustrating the reed-frame. Fig. 10 is a detail view, showing an end elevation of the reed-frame operating mechanism. Fig. 11 is a detail view, showing a front elevation of a portion of the reed construction. Fig. 12 is a detail view, showing a reed in side elevation and the reed-frame in section. Fig. 13 is a side elevation of the heddle-threading mechanism and showing also a portion of the fabric-form. Fig. 14 is a detail view, partly in section, illustrating a side elevation of the heddle-threading arm mechanism. Fig. 15 is a detail plan view, on an enlarged scale, illustrating one of the heddle-threading fingers. Fig. 16 is a detail side elevation, on an enlarged scale, of the mechanism shown in Fig. 15. Fig. 17 is a detail side view, on an enlarged scale, of the heddle-threading finger, showing the same in position to open the heddle eye to receive the thread. Fig. 18 is a detail view corresponding to Fig. 17 and illustrating the action of the heddle-threading finger to open the heddle eye to receive the thread. Fig. 19 is a detail plan view, partly in section, illustrating the warp-form and the detachable section thereof. Fig. 20 is a detail side elevation of a portion of the construction shown in Fig. 19. Fig. 21 is a detail sectional view illustrating the joint construction in the warp and fabric form. Fig. 22 is a detail perspective view, illustrating the warp-retaining rings construction. Fig. 23 is a detail sectional view, taken through the warp-retaining rings and showing the manner of laying-up the warp. Fig. 24 is a detail side elevation, partly in section, of the warp-form, with the detachable section thereof removed. Fig. 25 is a diagrammatic view illustrating the warp and woof of the woven fabric. Fig. 26 is a detail diagrammatic cross-section of the woven fabric.

Corresponding parts in all the figures are denoted by the same reference characters.

Referring to the drawings, 1 designates an upright framework arranged to carry all the operating parts of the loom mechanism. From said framework extend two laterally-projecting studs, 2—2, upon which are respectively mounted a pair of flanged rollers or idlers, as at 3, constituting guides for fabric-form frames, 4—5. Said frames are of annular or ring contour and are separated a suitable distance in parallel relationship and are provided with a geared inner periphery, as at 6, which peripheries respectively mesh with pinions, 7—7, carried by a projecting shaft, 8, suitably journaled in the frame 1. The fabric-form frames 4 and 5 have a revoluble movement, imparted by the pinions 7—7, which movement is intermittent in steps adjusted to give the warp one step forward in time with the weaving action hereinafter described. The step movement is imparted to the annular or ring members constituting said fabric-form frames, by a ratchet, 9, carried by the shaft 8, and a pawl, 10, engaging said ratchet and mounted on a pivoted arm or lever, 11, to which is pivotally connected a yoke or rod, 12, carrying a roller, 13, bearing upon the periphery of a cam-disk, 14, having a peripheral depression or recess, as at 15. Continuous revoluble motion is imparted to the cam-disk 14 by means of a train of gears, 16, suitably journaled in the framework 1 and extending between a shaft, 17, which has its bearings in the frame 1 and carries the cam-disk 14, and a main drive-shaft, 18, which is mounted in bearings upon the frame 1. The train of gears 16 is adjusted to the requisite timed step movement of the annular frames or rings 4—5, and the action of the yoke or rod 12 is governed by the engagement of the shaft 17 with a guide slot, 19, in said rod and by a controlling spring, 20, acting upon said rod to hold its roller 13 in bearing against the periphery of the cam-disk 14 (see Fig. 1).

The frames or rings 4—5 are adapted to carry the fabric-form, which constitutes a mandrel or core spanning said rings at the peripheral portion thereof and corresponding in contour to the inner segmental cross-section and endless annular form of the fabric which is to be woven as the body fabric or carcass for a tire shoe or casing. Said fabric-form frames or rings 4—5 are shaped at their outer periphery to receive the terminal ends of the mandrel or core, 21, which constitutes the fabric form, the inner frame or ring 4 being slightly larger in diameter than the outer frame or ring 5, and having a circumferential projecting flange, 22, provided at its inner face with an annular recess, 23, adapted to receive a projecting flange, 24, at one edge of the fabric-form, while the periphery of the frame or ring 5 is beveled or curved outwardly, as at 25, to receive a corresponding projecting flange, 26, at the other terminal edge of the fabric-form 21. The differential diameter of the frames or rings 4—5, in the construction as just described, in which the flanged-edge 34 of the form 21 is at a higher plane than its flanged-edge 26, enables the edge 24 of the fabric-form 21 to be passed over the outer frame or ring 5 in the removal of the form 21 from its carrying form-frames 4—5 and in its placement thereon in operative position (see Fig. 2). The fabric-form or mandrel 21 is retained in position by spring latches, 27, projecting at the inner face of the peripheral flange 22 of the inner frame or ring 4 and bearing with relation to the flanged-edge 24 of the fabric-form 21 to retain the latter in position with relation to the inner face of the flange 22 (see Figs. 3 and 4).

Rings or hoops, 30—31, are respectively mounted with relation to the terminal edges of the fabric-form 21, between which rings the warp is laid. The ring 30 is mounted in a socket between the inner face of the peripheral flange 22 of the frame 4 and the outer face of the edge-portion 24 of the fabric-form 21, while the ring 31 is mounted against the outer face of the edge-portion 26 of the form 21, said rings being thus peripherally related to the form-frames 4 and 5 and being carried thereby in the revoluble step movement thereof (Figs. 3 and 4). The inner ring or hoop 30 is provided throughout its periphery with a series of eye-rings, 32, having projecting hooks, 33, which are engaged by the warp thread, the latter being laid in spiral form from the hooks 33 to corresponding hooks, 28, respectively carried at the end of spiral tensional springs, 34, which are in turn respectively carried by eye-rings, 35, mounted in series throughout the periphery of the outer ring or hoop 31 (Figs. 5 and 22). The warp is thus laid to form a complete annular drum of warp-thread extending over and around the fabric form constituted by the mandrel or core 21. In the laying of the warp between the rings or hoops 30 and 31, the warp threads have the length required to pass over the fabric form 21 at the desired angle, plus what is taken up in the weaving of the woof threads and also an allowance for the percentage of crimp necessary to be put in the threads or strands to afford sufficient elasticity to withstand the conditions of strain or shock which would be encountered by the fabric as a tire carcass under the action of the tire in meeting inequalities in the road surface or obstructions thereon. It will be noted that the warp threads are held in fixed position at the inner ring 30 and that their excess length as just mentioned is held at the outer ring 31 and the tension of each thread is governed by the springs 34, which tensional control allows for sufficient give or lifting of the threads by the heddles to form sheds through which the shuttle passes in weaving the woof threads.

The mandrel or core 21 constituting the fabric form has a detachable section, 36, of suitable length and conforming to the transverse and segmental contour of said fabric form, the displacement of which section enables the insertion of the form 21 in the warp drum. Then, after the rings 30 and 31 are drawn down and socketed in the annular grooves formed by the flanges 24 and 26 of the form 21, the section 36 is replaced from the inside, thus forming the complete fabric form. In the mounting of the fabric form 21 and the warp in operative position, before placing the form 21 in position on the form frame 4—5 the rings 30 and 31 carrying the warp are given a twist in reverse directions, as indicated by the arrows in Fig. 22, until the warp threads lie over the form at the desired angle (see Fig. 5), and with the warp threads in this position the warp-carrying means are clamped or locked in connection with the form frame 4—5 by the spring latches 27 and by spring-controlled clamps, 37, pivotally mounted upon the outer face of the outer form-frame 5 and bearing against the warp-holding ring 35 upon the ring or hoop 31 (Figs. 4 and 5). The preferred angle at which the warp lies over the fabric form 21 is preferably such that the weave will be on an angle with the cross and circumferential section of the fabric for the tire carcass at approximately 45°, though any other adapted angle may be employed according to the conditions of use of the fabric.

From the foregoing description, it will be understood that the mandrel or core constituting the fabric form 21 extends in continuous annular and segmental cross-section contour, that the warp is laid in a corresponding continuous annular warp drum extending around and over said fabric form, and that said form and warp drum are secured in connection with the form frames of annular or ring shape which carry the same and which are advanced in a step movement to give the warp one step forward in time with the weaving action by means of the operating mechanism which is in connection with the main drive shaft of the apparatus. In the preferred construction, as herein shown, the warp form 21 and its carrying frame 4—5 are arranged in parallel relation to the front of the main framework 1 and in projecting position with relation to the same, and the heddle harness is arranged obliquely or at an angle to the warp-carrying means, said angle corresponding to the angle at which the warp threads lie over the fabric form 21 (see Figs. 2 and 3).

In the preferred construction of the heddle mechanism, the heddles are operatively housed in an annular jig, which is made up of segmental sections to permit the assembling of the heddle harness in its operative position encircling the upper part of the warp form 21. The heddle jig or carrying harness is thus mounted to operate around the cross-sectional plane of the warp form and in such manner as to automatically pick up one thread in the direction of its movement as one thread is dropped on the opposite side. The heddle operation is governed by means of a cam mechanism, as hereinafter described, the action of which operates only those heddles in which are carried warp threads.

The heddle jig or carrying harness comprises two annular side frames, 40—41, which are suitably supported in fixed parallel relationship upon the framework 1, as by means of brackets, 42—43. These frames encircle and surround the upper portion of the warp form 21 and its carrying frames 4—5, and to permit the removal and replacing of the warp form 21 in operative position said frames 40—41 are respectively divided into separable segments, at joints, 44, having removable locking pins, 45. Projecting inwardly and radially from the outer annular frame 41 is provided a series of arms, 46, carrying rollers, 47, at their inner ends, which rollers support an annular heddle-carrying frame, 48, mounted to rotate in the space between the frames 40—41. Said heddle frame 48 is provided centrally with a series of radial slots, 49, in which the heddles, 50, reciprocate, and the rollers 47 bear against a track constituted by a projecting side flange, 29, upon the outer side of the heddle-carrying frame. At the opposite or inner side of the heddle-carrying frame is provided a corresponding circumferential projecting track, 51, geared at its internal surface, as at 52, which gear meshes with supporting pinions, 53, suitably mounted upon the inner harness frame 40, one of which pinions is carried by a projecting shaft, 54, to which is imparted a step movement in relation to the step movement of the warp form 21, to operate the heddle-carrying frame in its rotary action. The preferred means for imparting said step movement comprises a ratchet, 55, carried by the shaft 54 and engaged by a pawl, 56, carried by an arm, 57, pivotally mounted upon the shaft 54 and connected by a pivoted link, 58, with a bell-crank lever, 59, suitably fulcrumed upon the framework 1 and having at its power end a roller, 60, bearing against the lateral cam face, 62, of a cam-disk, 38, fixed upon a shaft, 63, journaled in the framework 1 (Fig. 3). The bearing of the roller 60 with relation to the cam 38 is controlled by a spring, as at 61. The revoluble step movement of the heddle frame 48 is so adjusted, under the action of the mechanism just described, that the step motion imparted to the heddles corresponds to the rotary step movement of the warp in such manner that the warp thread in each respective heddle will remain in the heddle until it has completed its function as a warp thread and is interwoven with the woof threads.

The heddles 50 are provided with forked outer ends, as at 39, which are operatively and respectively engaged by the ends of a series of bell-crank levers, 64, fulcrumed peripherially upon the heddle-carrying frame 48 and projecting in opposite directions with relation to the series of heddles. The outer ends of the levers 64 operate in grooved guides, 66, which extend at opposite sides of the heddle frame 48 peripherally with relation thereto and extend over the section thereof wherein the heddles are operated. Said guides 66 are provided with outwardly and laterally projecting trunnions, 67, which are respectively and slidably operative in bearings in the frames 40 and 41, and said guides at opposite sides of the heddle frame 48 are connected in fixed relation by transverse cross pieces or bars, 68, spanning and projecting over the peripheral portion of the heddle frame 48.

In the practical construction of the heddle-carrying frame 48, it is of open or skeleton form as herein shown, and preferably comprises two substantially corresponding sections which are bolted together, as at 65, at the central plane of the peripheral portion of the heddle frame.

A reciprocating movement, laterally with respect to the heddles, is imparted to the guides 66, by trunnions, 69, slidably operating in bearings in the inner frame 40, said trunnions being connected to the guide frame 66—68 in suitable respectively spaced positions and projecting laterally therefrom and being connected at their outer ends by a cross bar, 70, fixed to said trunnions and pivotally carrying at its center a link or connecting rod, 71, which projects to pivotal connection with one arm of a bell-crank lever, 75, suitably fulcrumed upon the framework 1, and pivotally carrying at its other arm a yoke, 73, carrying a roller, 74, bearing with relation to the periphery of a two-motion cam disk, 72, carried upon an operating shaft (Fig. 2). Thus, a reciprocating step movement is transmitted to the cross bar 70 and by it to the guide frames 66, whereby the bell-crank levers 64 are moved alternately back and forth, the mechanism being relatively adjusted to a timed movement under which an alternate timed movement is imparted by the levers 64 to the heddles 50 and the latter are actuated to form a shed which is changed at each reciprocation of the shuttle, as hereinafter described. As before mentioned, each warp thread will remain in its heddle until that heddle has traversed the arc across the warp form 21, and the thread is then disengaged from the heddle.

The shaft, 140, carrying the two-motion cam 72 is suitably journaled in the framework 1, and said shaft, as well as the shaft 63 carrying the cam 38 for actuating the mechanism whereby the heddle-carrying frame 48 is operated in its rotary step movement, are in connection, by a suitable train of gears, as at 141, with the main drive shaft 18 of the apparatus. In this connection, it will of course be understood that the train of connecting gears 141 and the train of gears 16, through which relative motion is imparted to the respective mechanisms hereinbefore described from the main drive shaft 18, are so adjusted in size and operative association that the step movement of the form frames 4—5 and the fabric form 21 to advance the warp drum, and the step movement of the heddle-carrying frame 48 in its rotary action around the upper portion of the fabric form 21, and the reciprocating movement of the guide frames 66 laterally with respect to the plane of the revoluble movement of the heddle-carrying frame 48 to operate the bell-crank levers 64 to cause the action of the heddles, are all respectively and relatively timed in their operative co-action for the weaving of the woof threads with the laid warp under the conditions of operation as herein set forth.

In the action of the heddles, in their movement around the arc of the warp form 21, the heddle is threaded to bring the warp thread within a hook-eye, 142, at the lower end of the heddle, by means of a pick-up finger mechanism which, in the preferred construction, I will now describe. Said mechanism operates in parallel relationship to the hook-eye of the heddles 50 and comprises a pick-up finger, as at 76, constituted by two members, 78—79, which relatively operate upon a fulcrum, 80, and the terminal ends of which form a nipper jaw, as at 77, for picking up the warp thread (Figs. 15 and 16). The pivot constituting the fulcrum 80 of the finger members 78—79 is at a central point with relation to said members and is upon a stud, 143, projecting laterally from an arm, 81, which is journaled in and across a forked arm, 82, projecting at right angles to the finger mechanism. Said finger-carrying arm or member 81 carries a pinion, 83, within the forked arm 82, which pinion is engaged by a rack bar, 84, to actuate the finger-carrying arm 81 in a movement as hereinafter described. The finger members 78—79 are normally held in position to close the nipper jaw 77 by the action of a spring, 88, connected with and co-acting upon said members. The nipper jaw 77 is opened, by action of the finger members 78—79, by a bar, 85, interposed between said finger members and the arm 81 and slotted, as at 144, to surround the fulcrum stud 80 and be guided thereon, said bar 85 carrying at its inner end a pin, 87, projecting transversely of the arm 81 and moving in a slot, as at 145, therein. The pin 87 projects between the finger members 78—79, in rear of their fulcrum, and also projects at the opposite face of the arm 81, where it is connected with a coiled spring, 86, extending forwardly to a fixed connection with the arm 81, whereby said nipper-opening bar 85 is normally held under tension in an outwardly-projecting position in which its outer end projects beyond the nipper jaw 77. The forked arm 82, carrying the finger-threading mechanism as just described, has a motion laterally toward the warp form 21 (as indicated in dotted lines in Fig. 14), and in this motion carries the finger mechanism 76 toward the warp form until the nipper-opening bar 85 engages the hooks 33 with which the warp thread is engaged, when a further forward movement causes the bar 85 to move backwardly and its pin 87 bears against the rear ends of the finger members 78—79 against the tension of the spring 88 and spreads said members to open the nipper jaw 77 for the reception of the warp thread. In relation to the action just described, it will be noted that the finger-carrying arm 81 has an oscillating movement back and forth by reason of corresponding movement of the forked arm 82 by which it is carried. After the rearward movement of the bar 85, to open the nipper jaw 77, a slight movement of the forked arm 82 in a direction away from the warp form 21 releases the pressure of the pin 87 against the finger members 78—79, by action of the spring 86 controlling said pin 87, which permits the nipper jaw 77 to close on the warp thread. The operative movement of the forked arm 82 carrying the nipper finger-mechanism, as above described, is imparted by a drum-cam, 90, which actuates a ball-faced finger, 91, traveling in a peripheral groove, 89, upon the cam member 90, said groove having a lateral cam form (Fig. 3) and said finger 91 being carried at one end of a bell-crank lever, 92, which is mounted to move laterally, said lever 92 being pivotally fulcrumed, as at 93, in a pin, 94, which is revolubly journaled in a bracket, 146, upon the framework 1 (Fig. 13). The bell-crank lever 92 also has a vertical movement, at right angles to the lateral movement just described, which is permitted by a depression or recess, 147, in the base wall of the cam-groove 89 at a suitable point with relation to the lateral cam form of said groove, which depression receives the ball-faced finger 91 and thus permits an upward movement of the other arm of the lever 92 to which the forked arm 82 is pivotally connected at its lower end, as at 148.

From the foregoing it will be uderstood that the forked arm 82 has both a vertical movement and the lateral oscillating movement before described, which vertical movement is so timed with relation to the oscillating or lateral movement that when the nipper jaw 77 has picked up the warp thread the jaw will move upwardly and outwardly on an angle with the thread until the thread is drawn along the preceding heddle and over the hook-eye 142 of the next heddle to be threaded (Fig. 17). The threading-finger mechanism 76 is then given a further movement, by action of the finger-carrying arm 81 under movement of the rack bar 84, in which said finger mechanism is oscillated in a plane at right angles to the plane of the lateral or oscillating movement of the forked arm 82. This oscillating movement of the finger mechanism 76 is preferably at about 90°, to bring a lateral projection, 149, at the nipper-jaw end of the finger member 79 in line with the terminal hook-eye of the heddle, when, by a further movement of the forked arm 82 under action of the cam 90, the mechanism as just described will open the hook-eye (Fig. 18) and allow it to close over the thread and draw the thread down to the lower end of the eye in position for the weaving action.

The preferred means for effecting the upward or vertical movement of the forked arm 82 comprises a yoke link or bar, 95, which is pivotally connected, as at 150, with the arm 82 at a point above its fulcrum 148, said yoke having its free end embracing a shaft, 96, and carrying a roller, 151, bearing upon the periphery of a cam disk, 97, carried by said shaft (Fig. 13). The shaft 96 is suitably journaled upon the framework 1 and also carries the cam member 90 and is in suitable geared connection with the main driving mechanism of the loom. To effect the supplementary oscillating movement of the finger-carrying arm 81, which is at right angles to the oscillating or lateral movement of the forked arm 82, said arm 81 is, in the preferred construction, eccentric to the axis of its bearing in the forked arm 82 (Fig. 16) and the actuating rack bar 84 is slidably mounted in a suitable guide, 152, upon the side of the arm 82 and has its lower end pivotally connected to one arm of a bell-crank lever, 98, fulcrumed upon the arm 82, the other arm of said lever being pivotally connected to a yoke link or bar, 99, the free end of which embraces the shaft 96 and which carries a roller, 153, bearing upon the periphery of a cam disk, 100, carried by said shaft (Fig. 13).

From the foregoing description, it will be understood that the heddle-threading mechanism has three movements, to wit: a lateral or oscillating movement to and from the warp form 21, to pick up the thread; a vertical movement at right angles to said first lateral movement, to govern the position of the thread for threading in the heddle; and a supplementary oscillating movement of the pick-up finger mechanism, at right angles to said lateral movement, to place the thread in the heddle-eye; the actuating mechanism controlling these movements being so adjusted that all the operations in threading the heddle are relatively timed and each warp thread is picked up and threaded in its respective heddle as the heddles travel coincident with the progressive feed movement of the warp.

It will be noted that the grooved guides 66, which extend over the section or segment of the heddle-carrying frame 48 wherein the heddles are operated, have their terminal ends flared, as at 154, to automatically receive the outer ends of the heddle-actuating levers 64 as the latter enter said guides, into the section or segment wherein the heddles are operated, in the revoluble movement of the heddle-carrying frame (Figs. 4 and 5).

The shuttle mechanism comprises a holder or cage, 102, which is directly under the shed formed in the warp (Fig. 4) and into which a shuttle, 101, is dropped, said cage being suitably supported upon a bracket, 155, supported upon the framework 1, and a similar holder or cage, 103, is provided at the opposite side and supported upon a bracket, 156. Said shuttle-holders or cages are arranged at opposite sides of the warp form 21 and adjacent the base edges thereof, so that the shuttle travels from one side of the warp form and over the arc thereof to the opposite side. In the preferred construction, the movement and travel of the shuttle is controlled by a magnetic mechanism similar to that shown and described in my co-pending application for Patent Serial No. 801,001, which mechanism in its relation to the present improved loom construction I will now describe.

It will of course be understood that the shuttles are constructed of steel or other material subject to magnetic action, and are in effect operative as armatures controlled and moved by the magnet in the oscillating or reciprocating operation of the latter. The shuttles, however, may be in the main of any usual or adapted construction operating in the usual manner to carry and feed the woof or filling threads. The magnetic shuttle-operating mechanism, in the present loom construction, is mounted to operate within the warp form 21 in a path transverse to the arc or segment thereof, and comprises a magnetic shoe, 105, carried at the end of an arm, 157, passing through a bracket, 113, said arm being spring-controlled by action of a coiled spring, 158, carried by said bracket and acting to force said arm outwardly, whereby the magnet 105 is spring-alined with the inner surface of the warp form 21. The outer end of the bracket 113 carries a counter-weight, 159, whereby the movement of the arm 157 and the magnet 105 is balanced or steadied. The bracket 113 is carried by a revoluble shaft, 160, at right angles to said bracket, which shaft is mounted with its axis at the center of the arc formed by the transverse contour of the warp form 21 (Figs. 4 and 7). The magnet is thus fulcrumed at the center of said arc, to move in an oscillating action in a path traversing said arc back and forth and at the angle preferably of 45°, hereinbefore referred to, with relation to the arc. It will be understood that the arm 157 is slidably mounted in the bracket 113, and that said bracket and arm and the magnet 105 are carried in the revoluble movement of the shaft 160. Said shaft 160 is operated, to impart the oscillating movement to the magnet 105, by means of a mechanism comprising a cam, 106, mounted on the shaft 63 (Fig. 3) and having a cam face, 161, engaged by a pin or roller, as at 162, laterally carried upon a yoke link or bar, 107, the free end of which embraces the shaft 63 and the other end of which is provided with a rack, 163, engaging a pinion, 108, and held to said engagement by a guide bracket, 109, suitably projecting from the framework 1. A reciprocating motion is thus imparted to the bar 107, and the pinion 108 oscillates a shaft, 110, which carries said pinion and is journaled in the framework 1, and to said shaft is connected, by a universal joint, as at 164, a link or rod, 111, which has a universal-joint connection, as at 165, with the end of a revolubly-mounted shaft, 166, which is at right angles to the shaft 160 and carries a beveled gear, 112, meshing with a beveled gear, 114, upon the shaft 160 (Figs. 3, 4 and 7). The shafts 166 and 160 have their bearings in a suitable bracket, 167, mounted upon the framework 1, which bracket may carry the brackets 156 and 155 which support the shuttle cages or holders 102 and 103 (Fig. 4). It will be understood that the foregoing mechanism as just described, for operating the magnetic shoe 105 which controls the movement of the shuttle, is adjusted to impart the required oscillating action of the magnet in time with and relation to the operative movement of the heddles to form the shed in the warp through which the shuttle passes. The outer surface of the core of the magnet 105 is preferably beveled, as at 168 (Figs. 4 and 7), to conform to and follow the segmental contour of the inner surface of the shell of the warp form 21 within which the magnet operates in its oscillating movement back and forth in the arc transversely of said warp form and on an angle preferably of 45° to the horizontal axis of the warp form.

As before set forth, the warp is laid continuously over the warp form 21 and throughout the annular endless extent thereof, with the warp threads at an angle (preferably 45°) to the horizontal axis of the warp form, and the heddle-carrying frame surrounds the warp form in an oblique position reversely corresponding to the angle at which the warp threads lay over said form, so that the annular series of heddles are operative successively at said angle. Thus, as the warp form is advanced in its revoluble step movement, the revoluble step movement of the heddle-carrying frame carries the heddles in their successive operative movement in a path reversely corresponding to the angle at which the warp threads lay over the warp form, and the shuttle-operating mechanism operates in a corresponding path at an angle to the horizontal axis of the warp form to carry the shuttle through the sheds formed by the action of the heddles successively in said path at an angle to the horizontal axis of the warp form, the operative action of the heddles being such that one thread is dropped and another thread picked up at the respective terminals of said path of movement, whereby the fabric is woven on the bias as shown in Fig. 5, the relationship of the mechanism as just indicated being also shown in Figs. 1, 3, and 4. In this connection, it will be noted that a cross-section of the warp form parallel to its horizontal axis is elliptical in contour, as shown in Fig. 3, while a cross-section on the angle of 45°, in the path in which the heddles and shuttle and shuttle-operating mechanism are operative, is of true segmental contour, as shown in Fig. 4.

A batten mechanism is provided to properly close in or pack in position the woof threads, so that with each passage of the shuttle over and through the warp the woof or filling thread is effectively laid up with the reeds. In the preferred construction of the batten mechanism, the reeds, 115, are fulcrumed upon a cylindrical rod, 116, which is positioned in a semi-circular groove, 104, formed in the outer face of a bar, 117, slidably mounted to reciprocate at right angles to the pivotal movement of the reeds. The rod 116 is retained in its seat in the groove 104 by bolts, 118, projecting from the bar 117 and having a hook end, 170, engaging over the rod. Each reed is nested in a groove, 171, formed in the outer face of the bar 117 and intersecting the groove 104 (Figs. 11 and 12). The bar 117 is slidably mounted within and carried by a guide member, 119, the ends of which are respectively in fixed connection with arms, 120 and 121, projecting upwardly from and carried by a rock shaft, 169, suitably journaled in the framework 1 (Figs. 4 and 5). The shaft 169 is oscillated to impart a reciprocating motion to the arms 120 and 121 in a line approximately parallel to the warp form 21. The oscillation of the shaft 169 may be effected by any suitable gear or cam connection with the main driving mechanism, and I have herein shown (Fig. 5) a cam mechanism for this purpose, in which the lower end of the arm 120 is extended from its fixed connection with the shaft 169 and at an angle to its main upwardly-projecting portion, which extension, 182, carries at its outer end a roller, 183, bearing against the periphery of a cam-disk, 184, carried by a shaft, 185, suitably journaled in the framework 1 and in connection with the main driving mechanism, the bearing of the roller 183 upon the cam-disk 184 being tensionally controlled by a coiled spring, 186, extending between fixed connections with the extension 182 and the framework 1. The arms 120 and 121 respectively project to a position opposite the terminal edge portions of the warp form 21, and the guide 119 and the bar 117 extend segmentally so that in their longitudinal extent they surround the segment of the warp form in which the heddles are operating and carry the reeds in radial position with relation to the warp form and in segmental series (Figs. 4, 5 and 9).

The batten and reed mechanism as above described, has a reciprocating motion approximately parallel to the warp form, and the reeds which are carried in this reciprocating movement also have the usual pivotal operative movement. The reeds also have an additional movement whereby they will follow the angle of approximately 45°, hereinbefore referred to, at which the warp threads are laid, to accomplish which the slidably-mounted bar 117, carrying the reeds, is given an oscillating or reciprocating movement within its carrying guide 119. The reciprocating movement of the bar 117 is in the line of its segmental contour and at right angles to the movement of the arms 120 and 121 carrying the batten and reed mechanism, and the movement imparted to the bar 117 corresponds to the distance traversed in the coincident movement of said arms, the ultimate position being indicated in dotted lines in Fig. 5. The slidable movement of the bar 117 with relation to the distance traversed by the arms 120 and 121, to said position as indicated in dotted lines, is thus as one side is to the hypothenuse of a right angle triangle.

The preferred mechanism for imparting the above described movement to the bar 117 preferably comprises a link, 123, the upper end of which is pivotally connected as at 122, to one end of said bar, the pivotal connection being braced by a stud, 172, projecting laterally from the end of the bar and slidably operating in a guide slot, 173, in the upper end of the arm 120. The lower end of said link is pivotally connected, as at 174, with a block, 175, carrying a projecting stud, 124, operating in a guide slot, 176, in the arm 120, and carrying a roller, 125, traveling upon an incline, as at 126, formed by a track member, 177, suitably supported upon the main framework 1 (Figs. 4, 9 and 10). The pivotal connections of the link 123 are at right angles to the projecting guide studs 172 and 124, and the link moves in a position parallel to the arm 120 by which it is carried. Thus, when the arm 120 moves in its reciprocating action in the direction indicated by the arrow in Fig. 10, to carry the batten and reed mechanism in the movement parallel to the warp form as hereinbefore described, the roller 125 will travel up the incline 126 and transmit a corresponding upward movement to the link 123 which operates the bar 117 in its slidable movement in the fixed guide member 119 to impart to the reeds the hereinbefore described movement whereby they follow the contour or line of the warp thread at the approximate angle of 45° in traveling from the position shown in full lines at $a$ to the position shown in dotted lines at $b$, Fig. 5. The upward movement of the link 123 is against the tension of a coiled spring, 127, which operates to return the mechanism controlling the motion of the reeds, as just described, to its initial position with relation to the incline 126, said spring being mounted between a bracket, 178, projecting from the arm 120, and a flange or block, 179, upon a pin or bar, 180, which slidably operates through the bracket 178 and bears at its lower end against the block 175 which is carried by the link 123 (Figs. 9 and 10).

The operation and advantages of my improved loom mechanism will be readily understood by those skilled in the art to which the invention appertains.

It will be understood that my improved loom mechanism is adapted for weaving an endless tubular fabric in annular or ring form, and also that the general features of improvement are adapted for effective and advantageous employment in looms adapted for the weaving of various other types of fabric. The loom mechanism constituting my present improvements is, however, especially adapted for the weaving of an internal textile body fabric or carcass for the shoe or casing of pneumatic tires, having its body woven initially in the contour of an endless annular and segmental cross-section ring conforming to the contour of the elastic body of the shoe or casing within which it is to be embedded, and with its threads or strands initially in normal relationship to said body contour, which type of body fabric is specifically shown and described in my previous applications for patents Serial Nos. 725,245 and 725,246. The present improved loom mechanism is designed particularly for weaving said type of body fabric for pneumatic tires on the bias, substantially as shown in Figs. 25 and 26, whereas the loom mechanism shown and described in my co-pending application for patent Serial No. 801,001 is especially adapted for weaving body fabrics of this character with the warp and woof threads in straight lines longitudinally and transversely of the body fabric and with relation to its service position in the tire casing.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. In a loom for circular weaving, a fabric form frame rotatably mounted and constituted by annular or ring shape members spaced apart, and a fabric form constituted by a member also of annular or ring shape and of segmental cross-section corresponding to the annular and segmental cross-section contour of the body fabric to be woven, said fabric form spanning the space between and having its respective terminal edges detachably secured in connection with the peripheries of the respective ring members of the form-frame and constituting a mandrel or core for carrying the warp in its normal laid position conforming to the fabric form during the weaving of the woof, the interior of said fabric form being open to the space between said ring members of the form-frame.

2. In a loom for circular weaving, a fabric form extending continuously in annular or ring shape and corresponding in surface contour to the annular and segmental cross-section of the body fabric to be woven, said fabric form having a section or segment of its annular body detachable from its main portion, and said sectional form constituting in its complete annulus a mandrel or core for carrying a warp drum in its normal laid position conforming to the fabric form during the weaving of the woof.

3. In a loom for circular weaving, a fabric form extending continuously in annular or ring shape and corresponding in surface contour to the annular and segmental cross-section of the body fabric to be woven, and detachable means for carrying and retaining a warp drum in its normal laid position conforming to the fabric form during the weaving of the woof, said fabric form having a detachable section or segment to enable the insertion of the form within the warp drum which is carried by said detachable means.

4. In a loom for circular weaving, a fabric form extending in annular or ring shape and corresponding in surface contour to the annular and segmental cross-section of the body fabric to be woven, said fabric form constituting a mandrel or core for the warp during the weaving of the woof, and means constituted by a unit secured in connection with said fabric form for carrying the warp in its normal laid position extending over and conforming to the form, said unit member comprising means for collectively carrying a plurality of threads of the warp and being detachable as a unit from said fabric form.

5. In a loom for circular weaving, a fabric form extending in annular or ring shape and corresponding in surface contour to the annular and segmental cross-section of the body fabric to be woven, said fabric form constituting a mandrel or core for the warp during the weaving of the woof, and annular or ring members detachably secured in connection with said fabric form at the respective side base portions thereof, said detachable ring members constituting means for carrying the warp in its normal laid position extending over and conforming to the fabric form.

6. In a loom for circular weaving, a fabric form extending in annular or ring shape and corresponding in surface contour to the annular and segmental cross-section of the body fabric to be woven, said fabric form having annular sockets at its respective side base portions and constituting a mandrel or core for the warp during the weaving of the woof, and detachable annular or ring members seated and secured at said base sockets, said detachable ring members constituting means for carrying the warp in its normal laid position extending over and conforming to the fabric form.

7. In a loom for circular weaving, a fabric form revolubly mounted and extending in annular or ring shape and constituting a mandrel or core for the warp in its normal laid position conforming to the fabric form during the weaving of the woof, and means constituted by a unit secured in connection with said fabric form for carrying the warp in its normal laid position extending over and conforming to the form, said unit member comprising means for collectively carrying a plurality of threads of the warp and being detachable as a unit from said fabric form.

8. In a loom for circular weaving, a fabric form constituting a mandrel or core for the warp in its normal laid position conforming to the fabric form during the weaving of the woof, and annular or ring members detachably secured in connection with said fabric form at the respective opposite sides thereof, said detachable ring members constituting means for carrying the warp in its normal laid position extending over and conforming to the fabric form.

9. In a loom for circular weaving, annular or ring members for carrying the warp, means carried by said ring member for engaging the warp and retaining the same in laid position extending between said ring members, and a fabric form extending between said ring members and constituting a mandrel for the warp in its normal laid position.

10. In a loom for circular weaving, annular or ring members for carrying the warp, means carried by said ring members for engaging the warp and retaining the same in laid position extending between said ring members, said means extending continuously of the annulus of the ring members, and a fabric form extending between said ring members and constituting a mandrel for the warp in its normal laid position as a continuous annular drum.

11. In a loom for circular weaving, annular or ring members for carrying the warp, tensional means for retaining the warp in laid position extending between said ring members, and a fabric form extending between said ring members and constituting a mandrel for the warp in its normal laid position.

12. In a loom for circular weaving, annular or ring members for carrying the warp, means carried by said ring members for engaging the warp, tensional means for controlling said engaging means, whereby the warp may be carried by said engaging means in laid position extending between said ring members and under tensional control, and a fabric form extending between said ring members and constituting a mandrel for the warp in its normal laid position.

13. In a loom for circular weaving, warp-carrying members respectively constituted by a unit and spaced apart, each of said unit members comprising means for collectively carrying the plurality of threads of the warp in continuous laid position extending between said members, and a fabric form extending between said spaced unit members and constituting a mandrel for the warp in its normal laid position.

14. In a loom for circular weaving, warp-carrying members spaced apart and comprising means for carrying the warp in continuous laid position extending between said members and as a continuous annular drum, means for tensionally controlling the spread of the warp between said memmbers, and a fabric form extending between said spaced members and constituting a mandrel for the warp in its normal laid position.

15. In a loom for circular weaving, annular or ring members for carrying the warp, means for retaining the warp in laid position extending between said ring members, said ring members being relatively spaced and independently arranged to permit a twisting movement respectively in reverse directions whereby the laid warp extending between the same will be brought to an angle with relation to a transverse plane between said members, and a fabric form extending between said spaced ring members and constituting a mandrel for the warp in its normal laid position.

16. In a loom for circular weaving, annular or ring members for carrying the warp, means for retaining the warp in continuous laid position extending between said ring members and as an annular drum, means for retaining said ring members in relatively spaced and turnably mounted position whereby said ring members may be respectively twisted in reverse directions upon their turnable mounting to bring the laid warp extending between the same at an angle with relation to a transverse plane between said members, and a fabric form extending between said spaced members and constituting a mandrel for the warp in its normal laid position.

17. In a loom for circular weaving, annular or ring members for carrying the warp, and means for retaining the warp in continuous laid position extending between said ring members and as an annular drum, in combination with a fabric form extending in annular or ring shape between said ring members and constituting a mandrel or core for the warp in its normal laid position during the weaving of the woof, said ring members having a turnable mounting at opposite sides of said fabric form whereby said ring members may be relatively twisted in reverse directions upon their turnable mounting to bring the laid warp extending over the fabric form at an angle with relation to the cross and circumferential section of the warp drum.

18. In a loom, spaced members for carrying the warp in laid position extending between said members, in combination with a fabric form extending between said carrying members and constituting a mandrel or core for the warp in its normal laid position during the weaving of the woof, said carrying members having a movable mounting at opposite sides of said fabric form whereby they may be relatively operated in reverse directions to bring the laid warp extending over the fabric form at an angle with relation to the cross and longitudinal section of the fabric form.

19. In a loom, spaced members respectively constituted by a unit for collectively carrying the plurality of threads of the warp and retaining the same in laid position extending between said members, in combination with a fabric form extending between said unitary spaced carrying members and constituting a mandrel or core for the warp in its normal laid position during the weaving of the woof.

20. In a loom for circular weaving, a revolubly mounted fabric form constituting a mandrel or core for the warp in its normal laid position during the weaving of the woof, and members respectively constituted by a unit separable from said fabric form and operative at opposite sides thereof, each of said unitary side members comprising means for collectively carrying and retaining the plurality of threads of the warp in laid position extending over and conforming to the fabric form.

21. In a loom for circular weaving, a revolubly mounted fabric-form frame, a fabric form peripherally carried by and connected with said form-frame and constituting a mandrel or core for the warp in its normal laid position during the weaving of the woof, and members respectively constituted by a unit separable from and operatively carried by and at opposite sides of said fabric form, each of said unitary side members comprising means for collectively carrying the plurality of threads of the warp and retaining the warp in its normal laid position extending over and conforming to the fabric form.

22. In a loom for circular weaving, a heddle-carrying frame revolubly mounted and of annular or ring shape, a series of heddles reciprocally and radially carried by said frame, means for advancing said frame in a revoluble step movement, and means for actuating the heddles in their reciprocal movement with relation to the step movement of said carrying-frame.

23. In a loom for circular weaving, a heddle-carrying frame revolubly mounted and of annular or ring shape, a series of heddles reciprocally and radially carried by said frame, means for operating the heddles in their reciprocal movement, and means movable laterally with relation to the revoluble movement of the heddle-carrying frame for actuating said heddle-operating means.

24. In a loom for circular weaving, a heddle-carrying frame revolubly mounted and of annular or ring shape, a series of heddles reciprocally and radially carried by said frame, lever means fulcrumed upon said frame and operatively actuating the heddles in their reciprocal movement, a guide frame operatively engaging said lever means to actuate the same, and means for moving said guide frame with relation to the operative movement of the heddle-carrying frame.

25. In a loom for circular weaving, a heddle-carrying frame revolubly mounted and of annular or ring shape, a series of heddles reciprocally and radially carried by said frame, a series of bell-crank levers fulcrumed upon said frame at opposite sides of the series of heddles and operatively engaging the heddles to actuate the same in their reciprocal movement, a guide frame operatively engaging said bell-crank levers at the respective opposite sides of the series of heddles, and means for moving said guide frame laterally with relation to the revoluble movement of the heddle-carrying frame.

26. In a loom for circular weaving, a fabric form revolubly mounted and extending in annular or ring shape and constituting a mandrel or core for the warp in its normal laid position during the weaving of the woof, and a heddle-carrying frame of annular or ring shape revolubly mounted and encircling a segment of said annular fabric form.

27. In a loom for circular weaving, a fabric form revolubly mounted and extending in annular or ring shape and constituting a mandrel or core for the warp in its normal laid position during the weaving of the woof, and a heddle-carrying frame of annular or ring shape revolubly mounted and encircling a segment of said annular fabric form at an angle with relation to the cross and circumferential section thereof.

28. In a loom for circular weaving, a fabric form revolubly mounted and extending in annular or ring shape and constituting a mandrel or core for the warp in its normal laid position during the weaving of the woof, a heddle-carrying frame of annular or ring shape revolubly mounted and encircling a segment of said annular fabric form obliquely or at an angle with relation to the transverse plane thereof, and a series of heddles reciprocally and radially carried by said frame, whereby said heddles are operative in a path at an angle with relation to the cross and longitudinal section of the fabric form.

29. In a loom for circular weaving, a fabric form revolubly mounted and extending in annular or ring shape and constituting a mandrel or core for the warp in its normal laid position during the weaving of the woof, and a heddle-carrying harness of annular or ring shape encircling a segment of said annular fabric form, said annular heddle-carrying harness comprising separable segments whereby the assembling of the fabric form and heddle-carrying harness in said relative operative positions is enabled.

30. In a loom for circular weaving, a fabric form revolubly mounted and extending in annular or ring shape and constituting a mandrel or core for the warp in its normal laid position during the weaving of the woof, a heddle-carrying frame having a segment spanning a segment of said fabric form, and means for advancing said heddle-carrying frame in a movement crosswise of said fabric form.

31. In a loom for circular weaving, a fabric form revolubly mounted and extending in annular or ring shape and constituting a mandrel or core for the warp in its normal laid position during the weaving of the woof, a heddle-carrying frame having a segment spanning a segment of said fabric form at an angle with relation to the cross and longitudinal section thereof, and means for advancing said heddle-carrying frame in a movement in the path of said angle.

32. In a loom for circular weaving, a fabric form revolubly mounted and extending in annular or ring shape and constituting a mandrel or core for the warp in its normal laid position during the weaving of the woof, a heddle-carrying frame having a segment spanning a segment of said fabric form obliquely or at an angle with relation to the longitudinal section thereof, a series of heddles radially operative in said segment of the heddle-carrying frame, and means for advancing said frame in a movement in the path of said angle.

33. In a loom, a fabric form constituting a mandrel or core for the warp in its normal laid position during the weaving of the woof, means for carrying the woof in continuous laid position across said fabric form, means for advancing said form in a step movement, a heddle-carrying frame mounted over said fabric form obliquely or at an angle with relation to the cross-section thereof, a series of heddles operative in said heddle-carrying frame in the path of said angle, and means for advancing said heddle-carrying frame in a step movement with relation to the step movement of said fabric form.

34. In a loom for circular weaving, a fabric form revolubly mounted and extending in annular or ring shape and constituting a mandrel or core for the warp in its normal laid position during the weaving of the woof, means for advancing said fabric form in a step movement, a heddle-carrying frame spanning a segment of said fabric form, a series of heddles operative in the path of movement of said heddle-carrying frame, and means for advancing said frame in a step movement crosswise of the segment of the fabric form and with relation to the step movement thereof.

35. In a loom, a fabric form having a segmental transverse surface contour, a heddle-carrying frame having a segment spanning said fabric form, a series of heddles radially operative in said segment of the heddle-carrying frame, and means for advancing said segment of the heddle-carrying frame in a movement across the fabric form.

36. In a loom, a fabric form having a segmental transverse surface contour, a heddle-carrying frame having a segment spanning said fabric form, a series of heddles reciprocally and radially carried by the segment of said heddle-carrying frame, means for advancing said segment of the heddle-carrying frame in a movement across the fabric form, and means for actuating the heddles in their reciprocal movement with relation to the movement of said carrying-frame.

37. In a loom, a heddle-carrying frame comprising a segment movably mounted to traverse the fabric form, a series of heddles reciprocally and radially carried by the segment of said frame, and means for alternately actuating the successive heddles in their reciprocal movement during the movement of said frame.

38. In a loom, a heddle-carrying frame, a series of heddles reciprocally carried by said frame in its line of movement, means for advancing said frame in a step movement, and means operative laterally with relation to the movement of said frame and at opposite sides of the series of heddles for alternately actuating the successive heddles in their reciprocal movement.

39. In a loom, a heddle-carrying frame, a series of heddles reciprocally carried by said frame in its line of movement, means for advancing said frame in a step movement, and reversely-operating means for alternately actuating the successive heddles in their reciprocal movement with relation to the movement of the heddle-carrying frame.

40. In a loom for circular weaving, a fabric form revolubly mounted and extending in annular or ring shape and constituting a mandrel or core for the warp in its normal laid position during the weaving of the woof, a heddle-carrying frame revolubly mounted and of annular or ring shape encircling a segment of said annular fabric form, and an annular fixed frame sustaining said revoluble heddle-carrying frame and comprising separable segments whereby the assembling of the annular members in said relative operative positions is enabled.

41. In a loom for circular weaving, a fabric form revolubly mounted and extending in annular or ring shape and constituting a mandrel or core for the warp in its normal laid position during the weaving of the woof, a heddle-carrying frame revolubly mounted and of annular or ring shape encircling a segment of said annular fabric form, and an annular fixed frame sustaining said revoluble heddle-carrying frame and comprising separable segments, said fabric form having a detachable section or segment, whereby the insertion of the form within the warp drum and the assembling of the annular members in said relative operative position is enabled.

42. In a loom for circular weaving, a fabric-form frame revolubly mounted, a fabric form separably connected with and carried by said form-frame and having an annular or ring shape and corresponding in surface contour to the annular and segmental cross-section of the body fabric to be woven, said fabric form constituting a mandrel or core for the warp in its normal laid position during the weaving of the woof, detachable means for carrying the warp in its normal laid position conforming to the fabric form, a heddle-carrying frame having a segment spanning said fabric form, and means for advancing said heddle-carrying frame in a movement across said fabric form.

43. In a loom for circular weaving, a fabric-form frame revolubly mounted, a fabric form separably connected with and carried by said form-frame and having an annular or ring shape and corresponding in surface contour to the annular and segmental cross-section of the body fabric to be woven, said fabric form constituting a mandrel or core for the warp in its normal laid position during the weaving of the woof, detachable means for carrying the warp in its normal laid position conforming to the fabric form, a heddle harness encircling a segment of said form-frame and fabric form, and a heddle-carrying frame of annular or ring shape revolubly mounted and carried by said heddle harness.

44. In a loom for circular weaving, a fabric-form frame revolubly mounted, a fabric form separably connected with and carried by said form-frame and constituted by a member of annular or ring shape and of segmental cross-section corresponding to the annular and segmental cross section contour of the body fabric to be woven, said fabric form constituting a mandrel or core for the warp in its normal laid position during the weaving of the woof, detachable means for carrying the warp in its normal laid position conforming to the fabric form, a heddle-carrying frame having a segment spanning said fabric form, means for advancing said heddle-carrying frame in a movement across said fabric form, and shuttle-operating means operative within the fabric form in the path of the segmental cross-section thereof.

45. In a loom for circular weaving, a fabric-form frame revolubly mounted, a fabric form separately connected with and carried by said form-frame and constituted by a member of annular or ring shape and of segmental cross-section corresponding to the annular and segmental cross-section contour of the body fabric to be woven, said fabric form constituting a mandrel or core for the warp in its normal laid position during the weaving of the woof, detachable means for carrying the warp in its normal laid position conforming to the fabric form, a heddle harness encircling a segment of said form-frame and fabric form, a heddle-carrying frame of annular or ring shape revolubly mounted and carried by said heddle harness, and shuttle-operating means operative within the fabric form in the path of the segmental cross-section thereof.

46. In a loom, a warp form constituting a mandrel for carrying the warp in its normal laid position during the weaving of the woof, a pick-up finger mechanism comprising two relatively pivoted members forming a nipper jaw, means for moving said mechanism laterally with relation to the warp form, and means operative coincident with said lateral movement to actuate said nipper-jaw members to open the same in their movement toward the warp form and close said members upon the thread during their movement from the warp form.

47. In a loom, a pick-up finger mechanism comprising two relatively pivoted members forming a nipper jaw, means for opening a heddle-eye to receive the thread, means for actuating said nipper-jaw members to open and close the jaw, and means for actuating said heddle-eye opening means in an operative movement.

48. In a loom, a pick-up finger mechanism comprising two relatively pivoted members forming a nipper jaw, means carried by said nipper-jaw mechanism for opening a heddle eye, means for operating said members to open and close the nipper jaw, and means for actuating said nipper-jaw mechanism in a movement to operate said heddle-eye opening means.

49. In a loom, a warp form constituting a mandrel for carrying the warp in its normal laid position during the weaving of the woof, a pick-up finger mechanism comprising two relatively pivoted members forming a nipper jaw, means for moving said mechanism laterally with relation to the warp form, means operative in said lateral movement to actuate said nipper-jaw members, and means carrying said nipper-jaw members in a movement at right angles to said lateral movement.

50. In a loom, a warp form constituting a mandrel for carrying the warp in its normal laid position during the weaving of the woof, a pick-up finger mechanism comprising two relatively pivoted members forming a nipper jaw, means carried by said nipper-jaw mechanism for opening a heddle eye, means for moving said mechanism laterally with relation to the warp form, means operative in said lateral movement to actuate said nipper-jaw members, and means carrying said nipper-jaw members in a movement at right angles to said lateral movement.

51. In a loom, a warp form constituting a mandrel for carrying the warp in its normal laid position during the weaving of the woof, a pick-up finger mechanism comprising two relatively pivoted members forming a nipper jaw, and means for moving said mechanism laterally with relation to the warp form and at right angles to said lateral movement to operatively actuate said nipper-jaw members.

52. In a loom, a warp form constituting a mandrel for carrying the warp in its normal laid position during the weaving of the woof, a pick-up finger mechanism comprising two relatively pivoted members forming a nipper jaw, means carried by said nipper-jaw mechanism for opening a heddle eye, and means for moving said mechanism laterally with relation to the warp form and at right angles to said lateral movement to operatively actuate the same.

53. In a loom, a pick-up finger mechanism comprising two relatively pivoted members forming a nipper jaw, and means for imparting an oscillating movement to said pick-up finger mechanism in directions relatively at right angles to each other.

54. In a loom, a warp form constituting a mandrel for carrying the warp in its normal laid position during the weaving of the woof, a pick-up finger mechanism comprising two relatively pivoted members forming a nipper jaw, means for moving said mechanism laterally with relation to the warp form to actuate said nipper-jaw members, and means for imparting a supplementary oscillating movement to said nipper-jaw members.

55. In a loom, a warp form constituting a mandrel for carrying the warp in its normal laid position during the weaving of the woof, a pick-up finger mechanism comprising two relatively pivoted members forming a nipper jaw, means for moving said mechanism laterally with relation to the warp form and at right angles to said lateral movement, and means for imparting a supplementary oscillating movement to said nipper-jaw members.

56. In a loom, a warp form constituting a mandrel for carrying the warp in its normal laid position during the weaving of the woof, a pick-up finger mechanism comprising two relatively pivoted members forming a nipper jaw, means carried by said nipper-jaw mechanism for opening a heddle eye, means for moving said mechanism laterally with relation to the warp form, and means for imparting a supplementary oscillating movement to said nipper-jaw members at right angles to said lateral movement.

57. In a loom, a warp form constituting a mandrel for carrying the warp in its normal laid position during the weaving of the woof, a pick-up finger mechanism comprising two relatively pivoted members forming a nipper jaw, means carried by said nipper-jaw mechanism for opening a heddle eye, means for moving said mechanism laterally with relation to the warp form and at right angles to said lateral movement, and means for imparting a supplementary oscillating movement in said nipper-jaw members at right angles to said lateral movement.

58. In a loom, a pick-up finger mechanism comprising two relatively pivoted members forming a nipper jaw, and an eccentrically mounted member carrying said nipper-jaw members and imparting an oscillating movement thereto.

59. In a loom, a warp form constituting a mandrel for carrying the warp in its normal laid position during the weaving of the woof, a pick-up finger mechanism comprising two relatively pivoted members forming a nipper jaw, an eccentrically mounted member carrying said nipper-jaw members and imparting an oscillating movement thereto, and means for moving said mechanism laterally with relation to the warp form, whereby said nipper-jaw members are carried in said lateral movement and also in an oscillating movement at right angles thereto.

60. In a loom, a warp form constituting a mandrel for carrying the warp in its normal laid position during the weaving of the woof, a pick-up finger mechanism comprising two relatively pivoted members forming a nipper jaw, an eccentrically mounted member carrying said nipper jaw members and imparting an oscillating movement thereto, and means for moving said mechanism laterally with relation to the warp form and at right angles to said lateral movement, whereby said nipper-jaw members have a lateral movement and a movement at right angles thereto and a supplementary oscillating movement at right angles to said lateral movement.

61. In a loom, a pick-up finger mechanism comprising two relatively pivoted members forming a nipper jaw, a pivotally mounted arm, a member eccentrically mounted in said arm and carrying said nipper jaw members, means for moving said arm laterally, and means for operating said eccentrically-mounted member in a movement at right angles to said lateral movement.

62. In a loom, a pick-up finger mechanism comprising two relatively pivoted members forming a nipper jaw, a pivotally mounted arm, a member eccentrically mounted in said arm and carrying said nipper-jaw members, means for operating said arm in a lateral movement and in a movement at right angles to said lateral movement, and means for operating said eccentrically-mounted member in a movement at right angles to said lateral movement.

63. In a loom, a pick-up finger mechanism comprising two relatively pivoted members forming a nipper jaw, means for operating said members to actuate the nipper jaw to pick up the thread, means for moving said members to bring the thread in position for threading in the heddle, and means for imparting an oscillating movement to said members to place the thread in the heddle-eye.

64. In a loom, a pick-up finger mechanism comprising two relatively pivoted members forming a nipper jaw, means carried by said nipper-jaw mechanism for opening a heddle eye, means for operating said members to actuate the nipper jaw to pick up the thread.

means for moving said members to bring the thread in position for threading in the heddle, and means for imparting an oscillating movement to said members to open the heddle-eye and place the thread therein.

65. In a loom, a fabric form corresponding in surface contour to the annular and segmental cross-section of the body fabric to be woven and constituting a mandrel or core for the warp in its normal laid position conforming to the fabric form during the weaving of the woof, means for forming a shed, and a shuttle mechanism operative with relation to said fabric form in a path across the segment thereof.

66. In a loom, a fabric form corresponding in surface contour to the annular and segmental cross-section of the body fabric to be woven and constituting a mandrel or core for the warp in its normal laid position conforming to the fabric form during the weaving of the woof, means for forming a shed, and a shuttle mechanism comprising shuttle holders or cages located with relation to the base of the segment of said fabric form, said shuttle mechanism being operative with relation to said fabric form in a path across the segment thereof.

67. In a loom, a fabric form corresponding in surface contour to the segmental cross-section of the body fabric to be woven and constituting a mandrel or core for the warp in its normal laid position during the weaving of the woof, means for forming a shed, and shuttle-actuating means comprising an electro-magnet operative with relation to said fabric form in a path across the segment thereof and controlling the movement of the shuttle in a corresponding path.

68. In a loom, a fabric form corresponding in surface contour to the segmental cross-section of the body fabric to be woven and constituting a mandrel or core for the warp in its normal laid position during the weaving of the woof, means for forming a shed, and shuttle-actuating means comprising an electro-magnet operative with relation to said fabric form in a path across the segment thereof and controlling the movement of the shuttle in a corresponding path, said electro-magnet being movable in its projective position with relation to the fabric form.

69. In a loom, a fabric form corresponding in surface contour to the segmental cross-section of the body fabric to be woven and constituting a mandrel or core for the warp in its normal laid position during the weaving of the woof, means for forming a shed, and shuttle-actuating means comprising an electro-magnet operative with relation to said fabric form in a path across the segment thereof and controlling the movement of the shuttle in a corresponding path, said electro-magnet being tensionally controlled in its projective position with relation to the fabric form.

70. In a loom, a fabric form corresponding in surface contour to the segmental cross-section of the body fabric to be woven and constituting a mandrel or core for the warp in its normal laid position during the weaving of the woof, means for forming a shed, and shuttle-actuating means comprising an electro-magnet operative with relation to said fabric form in a path across the segment thereof and controlling the movement of the shuttle in a corresponding path, said electro-magnet being mounted upon a revoluble axis and counterbalanced with relation to said axis.

71. In a loom, a fabric form corresponding in surface contour to the segmental cross-section of the body fabric to be woven and constituting a mandrel or core for the warp in its normal laid position during the weaving of the woof, means for forming a shed, and shuttle-actuating means comprising an electro-magnet operative with relation to said fabric form in a path across the segment thereof and controlling the movement of the shuttle in a corresponding path, said electro-magnet having its outer surface beveled to conform to and follow the segmental contour of said warp form.

72. In a loom, a fabric form constituted by a member or segmental cross-section corresponding to the segmental cross-section contour of the body fabric to be woven and constituting a mandrel or core for the warp in its normal laid position during the weaving of the woof, means for forming a shed, and shuttle-actuating means operative within said fabric form in a path across the segment thereof.

73. In a loom, a fabric form constituted by a member of segmental cross-section corresponding to the segmental cross-section contour of the body fabric to be woven and constituting a mandrel or core for the warp in its normal laid position during the weaving of the woof, means for forming a shed, and shuttle-actuating means comprising an electro-magnet operative within said fabric form in a path across the segment thereof and controlling the movement of the shuttle.

74. In a loom, a fabric form constituted by a member of segmental cross-section corresponding to the segmental cross-section contour of the body fabric to be woven and constituting a mandrel or core for the warp in its normal laid position during the weaving of the woof, means for forming a shed, and shuttle-actuating means comprising an electro-magnet operative within said fabric form in a path cross the segment thereof, and a shuttle constituting the armature of said electro-magnet and operative in a path over and across the segment of said fabric form.

75. In a loom, a fabric form constituted by a member of segmental cross-section corresponding to the segmental cross-section contour of the body fabric to be woven and constituting a mandrel or core for the warp in its normal laid position during the weaving of the woof, means for forming a shed, and shuttle-actuating means comprising an electro-magnet operative within said fabric form in a path across the segment thereof, said electro-magnet being movable in its projective position with relation to the inner surface of the fabric form.

76. In a loom, a fabric form constituted by a member of segmental cross-section corresponding to the segmental cross-section contour of the body fabric to be woven and constituting a mandrel or core for the warp in its normal laid position during the weaving of the woof, means for forming a shed, and shuttle-actuating means comprising an electro-magnet operative within said fabric form in a path across the segment thereof, said electro-magnet being tensionally controlled in its projective position with relation to the inner surface of the fabric form.

77. In a loom, a fabric form constituted by a member of segmental cross-section corresponding to the segmental cross-section contour of the body fabric to be woven and constituting a mandrel or core for the warp in its normal laid position during the weaving of the woof, means for forming a shed, and shuttle-actuating means comprising an electro-magnet operative within said fabric form in a path across the segment thereof, said electro-magnet being mounted upon a revoluble axis at the center of the arc of said segmental cross-section fabric form.

78. In a loom, a fabric form corresponding in surface contour to the segmental cross-section of the body fabric to be woven and constituting a mandrel or core for the warp in its normal laid position conforming to the fabric form during the weaving of the woof, means for forming a shed, a shuttle constituting a magnetic armature and operative with relation to said fabric form in a path over and across the segment thereof, and electro-magnetic means movable in said path and controlling the movement of the shuttle.

79. In a loom, a fabric form constituted by a member of segmental cross-section corresponding to the segmental cross-section contour of the body fabric to be woven and constituting a mandrel or core for the warp in its normal laid position conforming to the fabric form during the weaving of the woof, means for forming a shed, a shuttle constituting a magnetic armature and operative with relation to said fabric form in a path over and across the segment thereof, and electro-magnetic means operatively mounted with relation to the segment of the fabric form and movable in said path of travel of the shuttle and controlling the movement thereof.

80. In a loom, a fabric form corresponding in surface contour to the segmental cross-section of the body fabric to be woven and constituting a mandrel or core for the warp in its normal laid position during the weaving of the woof, means for forming a shed, a shuttle constituting a magnetic armature and operative with relation to said fabric form in a path across the segment thereof, and electro-magnetic means operatively mounted to move in a path obliquely or at an angle to the transverse plane of said fabric form and controlling the movement of the shuttle.

81. In a loom, a batten mechanism comprising a bar slidably mounted, a series of reeds projectively carried by said bar, and means for reciprocating said bar in directions relatively at right angles to each other to carry the reeds in an operative movement in unison.

82. In a loom, a batten mechanism comprising a member slidably mounted, a series of reeds projectively carried by said member, means for reciprocating said member to carry the reeds in an operative movement in unison, and means for moving said reed-carrying member in a direction at right angles to said reciprocating movement.

83. In a loom, a batten mechanism comprising a guide member, a member slidably carried by said guide member, a series of reeds projectively carried by said slidable member, means for actuating said reed-carrying member in a reciprocating movement with relation to said guide member to carry the reeds in an operative movement in unison, and means for actuating said guide member in a movement at right angles to the movement of said reed-carrying member.

84. In a loom, a batten mechanism comprising a guide member, a pivotally mounted arm carrying said guide member, means for operatively moving said arm to reciprocate said guide member, a member slidably carried by said guide member, a series of reeds projectively carried by said slidable member, and means carried by said arm for reciprocating said reed-carrying member in a direction at right angles to the operative movement of the arm.

85. In a loom, a batten mechanism comprising a guide member, an arm carrying said guide member, means for moving said arm to reciprocate said guide member, a member movably carried by said guide member, a series of reeds projectively carried by said movable member, and means operative in the movable action of said arm to operate said reed-carrying member in a reciprocal movement at right angles to the movement of said arm.

86. In a loom, a batten mechanism comprising a bar extending segmentally, a series of reeds projectively and radially carried by said bar, and means for reciprocating said bar in the line of its segment to carry the reeds in a corresponding operative movement.

87. In a loom, a batter mechanism comprising a member extending segmentally, a series of reeds projectively and radially carried by said member, means for reciprocating said member in the line of its segment to carry the reeds in a corresponding operative movement, and means for actuating said reed-carrying member in a movement in unison with its reciprocating movement and at right angles thereto.

88. In a loom, a batten mechanism comprising a guide member extending segmentally, a bar slidably carried by said guide member and conforming to the segment thereof, a series of reeds projectively and radially carried by said bar, means for actuating said reed-carrying bar in a reciprocating movement in the line of its segment to carry the reeds in a corresponding operative movement, and means for actuating said guide member in a movement in unison with the reciprocating movement of said reed-carrying bar and at right angles thereto.

89. In a loom, a fabric form corresponding in surface contour to the segmental cross-section of the body fabric to be woven and constituting a mandrel or core for the warp in its laid position during the weaving of the woof, and a batten mechanism comprising a member extending segmentally over the segment of said fabric form, and a series of reeds carried by said member and projecting radially with relation to the segment of said fabric form.

90. In a loom, a fabric form corresponding in surface contour to the segmental cross-section of the body fabric to be woven and constituting a mandrel or core for the warp in its laid position during the weaving of the woof, and a batten mechanism comprising a member extending segmentally over the segment of said fabric form, a series of reeds carried by said member and projecting radially with relation to the segment of said fabric form, and means for reciprocating said reed-carrying member in the line of its segment to carry the reeds in a corresponding movement with relation to the segment of said fabric form.

91. In a loom, a fabric form corresponding in surface contour to the segmental cross-section of the body fabric to be woven and constituting a mandrel or core for the warp in its laid position during the weaving of the woof, and a batten mechanism comprising a member extending segmentally over the segment of said fabric form, a series of reeds carried by said member and projecting radially with relation to the segment of said fabric form, means for reciprocating said reed-carrying member in the line of its segment to carry the reeds in a corresponding movement with relation to the segment of said fabric form, and means for actuating said reed-carrying member in a movement in unison with its reciprocating movement and parallel with relation to said warp form.

92. In a loom, a fabric form corresponding in surface contour to the segmental cross-section of the body fabric to be woven constituting a mandrel or core for the warp in its laid position during the weaving of the woof, and a batten mechanism comprising a member extending segmentally over the segment of said fabric form, a series of reeds carried by said member and projecting radially with relation to the segment of said fabric form, a guide member carrying said reed-carrying member and extending in corresponding segment with relation thereto, means for reciprocating said reed-carrying member in the line of its segment to carry the reeds in a corresponding movement with relation to the segment of said fabric form, and means for actuating said guide member in a movement in unison with the reciprocating movement of said reed-carrying member and parallel with relation to said warp form.

93. In a loom, a fabric form corresponding in surface contour to the segmental cross-section of the body fabric to be woven and constituting a mandrel or core for the warp in its laid position during the weaving of the woof, a segmental series of reeds spanning the segment of said fabric form, means for moving said reeds in a direction transverse with relation to the segment of the fabric form, and means for moving the reeds in a direction parallel to said fabric form and in unison with said first movement, whereby the reeds will traverse a path obliquely or at an angle to the transverse plane of said fabric form.

94. In a loom, a fabric form corresponding in surface contour to the segmental cross-section of the body fabric to be woven and constituting a mandrel or core for the warp in its laid position during the weaving of the woof, a segmental series of reeds spanning the segment of said fabric form, and means for moving the reeds across the segment of the fabric form in a path obliquely or at an angle to the transverse plane thereof.

95. In a loom, a fabric form corresponding in surface contour to the segmental cross-section of the body fabric to be woven and constituting a mandrel or core for the warp in its laid position during the weaving of the woof, a segmental series of reeds spanning the segment of said fabric form, means for moving the reeds in a direction parallel to the segment of said fabric form, and means for moving the reeds in a direction across the segment of said fabric form.

In witness whereof I have signed my name in the presence of the subscribing witnesses.

FREDRICK S. DICKINSON.

Witnesses:
 Jos. Reed Littell,
 Agnes A. Lee.